United States Patent [19]
Matsumaru et al.

[11] Patent Number: 5,959,962
[45] Date of Patent: Sep. 28, 1999

[54] OPTICAL DISK HAVING A FORMAT CONDITION INFORMATION DRIVE

[75] Inventors: Masaaki Matsumaru, Funabashi; Kozo Taira, Tokyo, both of Japan

[73] Assignee: Kabushiki Kaisha Toshiba, Kawasaki, Japan

[21] Appl. No.: 08/937,462

[22] Filed: Sep. 25, 1997

[30] Foreign Application Priority Data

Sep. 30, 1996 [JP] Japan .................................. 8-259938

[51] Int. Cl.⁶ ...................................................... G11B 7/24

[52] U.S. Cl. ...................................... 369/275.3; 369/275.4

[58] Field of Search ............................. 369/275.3, 275.4, 369/275.2, 58, 44.26, 48, 54

[56] References Cited

U.S. PATENT DOCUMENTS

| | | | |
|---|---|---|---|
| 4,821,253 | 4/1989 | Usui et al. | 369/54 |
| 5,602,823 | 2/1997 | Aoki et al. | 369/275.3 |
| 5,682,375 | 10/1997 | Imataki | 369/275.4 |

Primary Examiner—Tan Dinh
Attorney, Agent, or Firm—Oblon, Spivak, McClelland, Maier & Neustadt, P.C.

[57] ABSTRACT

An optical disk including a substrate and a recording film formed on the surface of the substrate, wherein the recording film includes an information recording domain. A servo information for a tracking control and a format condition information for formatting the information recording domain are provided on the substrate, and the information recording domain is formatted in accordance with the format condition information.

22 Claims, 5 Drawing Sheets

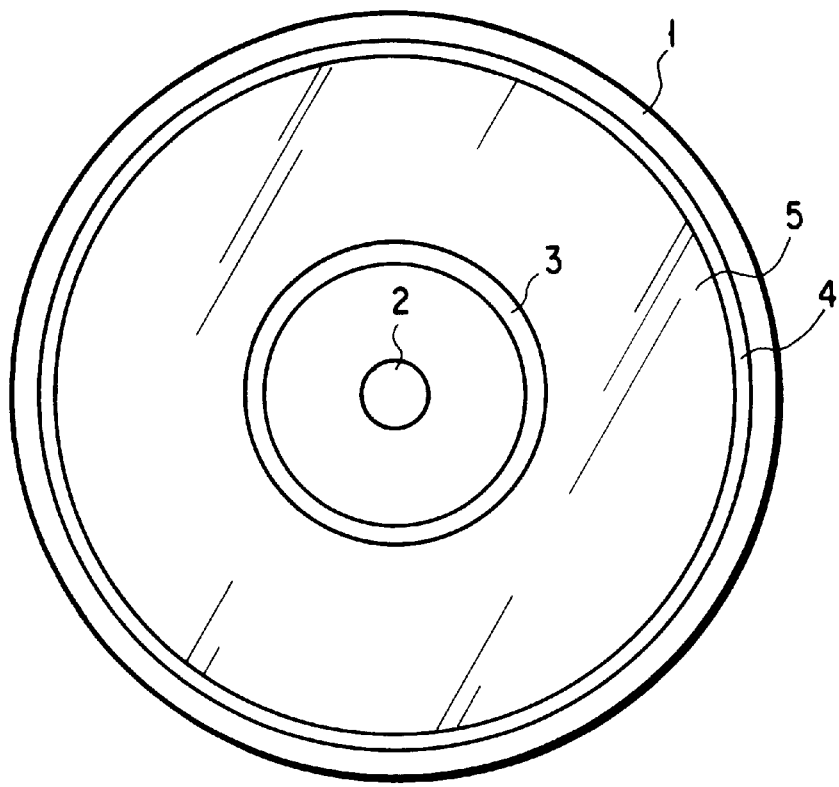
F I G. 1
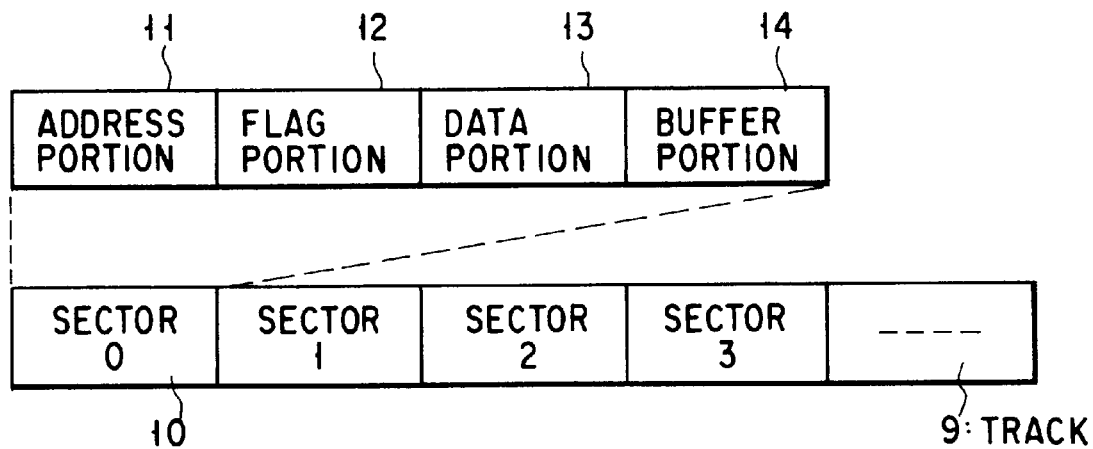
F I G. 2

OPTICAL DISK HAVING A FORMAT CONDITION INFORMATION DRIVE

BACKGROUND OF THE INVENTION

The present invention relates to an optical disk capable of recording and reproducing, such as a magneto-optical disk and a phase-change optical disk, in particular, to an optical disk with an easy formatting procedure.

Optical disks are explained in page 151 to page 196 of "Video Disk and Digital Audio Disk for Beginner's: compiled by Soichi Iwamura" published by Corona Co., Ltd. The production process of an optical disk will be explained simply. An original plate is prepared by applying a glass plate with a photo resist. The original plate is irradiated with a laser light beam by an exposing device so as to expose the photo resist. Then a pit or a groove is formed on the original plate by eliminating the exposed portion by the developing treatment of the photo resist. A disk plate is produced by the injection molding, utilizing a stamper formed by the original plate. An optical disk capable of recording and reproducing can be formed by forming a recording film on the disk plate. In the case of an optical disk dedicated for reproduction, an optical disk is produced by forming a reflecting film on a disk plate formed by the use of a stamper with the information pit already formed on an original plate.

Among these optical disks, in particular, a magneto-optical disk and a phase-change disk are used as the optical disks capable of recording and reproducing.

The magneto-optical disk is produced by forming a recording film comprising a ferromagnetic perpendicular magnetization film on a substrate. Information is recorded by generating a magnetic domain corresponding to the recording information in the recording film by condensing a light beam onto the recording film as well as applying a magnetic field. The recorded information can be reproduced by utilizing the change of the Kerr rotation angle, which depends on the orientation of the magnetic domain of the recording film.

On the other hand, information is recorded in the phase-change disk by selectively forming a crystalline portion and an amorphous portion in a recording film by utilizing the heat generated by condensing a light beam on the recording film. The recorded information is reproduced by utilizing the difference in the amount of the reflected light between the crystalline portion and the amorphous portion.

In either the magneto-optical medium or the phase-change medium, a light beam follows a track so as to utilize a land or a groove on the recording medium for controlling the tracking during recording or reproduction.

In soft-formating type optical disk as an optical disk capable of recording and reproducing, since ID information by a pre-pit such as address information is not recorded immediately after the production, the optical disk needs to be formatted by recording the ID information before use in order to record information. In this case, in conventional optical disks such as a magneto-optical medium and a phase-change medium, only a groove is formed on a face of the disk so that a starting point of formatting is not particularly defined.

Therefore, in formatting an optical disk by an optical disk drive device, the starting point of formatting is determined by the mechanical position of the drive device. This may result in the irregularity of the radius position with respect to the address information or incomplete formatting due to misplacement of the formatting starting point caused by disturbance so that a predetermined domain of the disk cannot be formatted.

BRIEF SUMMARY OF THE INVENTION

Accordingly, an object of the present invention is to provide an optical disk capable of being accurately formatted, and a production method thereof.

Another object of the present invention is to provide an optical disk capable of securely formatting the entire domain from the inner-diameter to the outer-diameter without suffering influence on the formatting starting point by the disturbance or the irregular radius position with respect to the address information, and a production method thereof.

The above-mentioned object is achieved by an optical disk of the present invention having an information recording domain comprising:

a substrate provided with servo information for a tracking control, and format condition information for formatting the information recording domain, and a recording film formed on a surface of the substrate provided with the servo information and the format condition information, and having a domain corresponding to the information recording domain is formated by an ID information.

In an optical disk of the present invention, format treatment including the formatting starting point is determined by providing format treatment information including the information for determining the starting point of the formatting onto the substrate. Therefore, failure such as the irregularity of the radius position with respect to the address information or incomplete formatting due to misplacement of the formatting starting point toward the outer-diameter side caused by disturbance so that a predetermined domain of the disk cannot be formatted, can be prevented.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 1 is a plan view showing the schematic configuration of one embodiment of an optical disk of the present invention;

FIG. 2 is a plan view showing the configuration of a track and sectors of the embodiment of the optical disk;

DETAILED DESCRIPTION OF THE INVENTION

Figure 3:
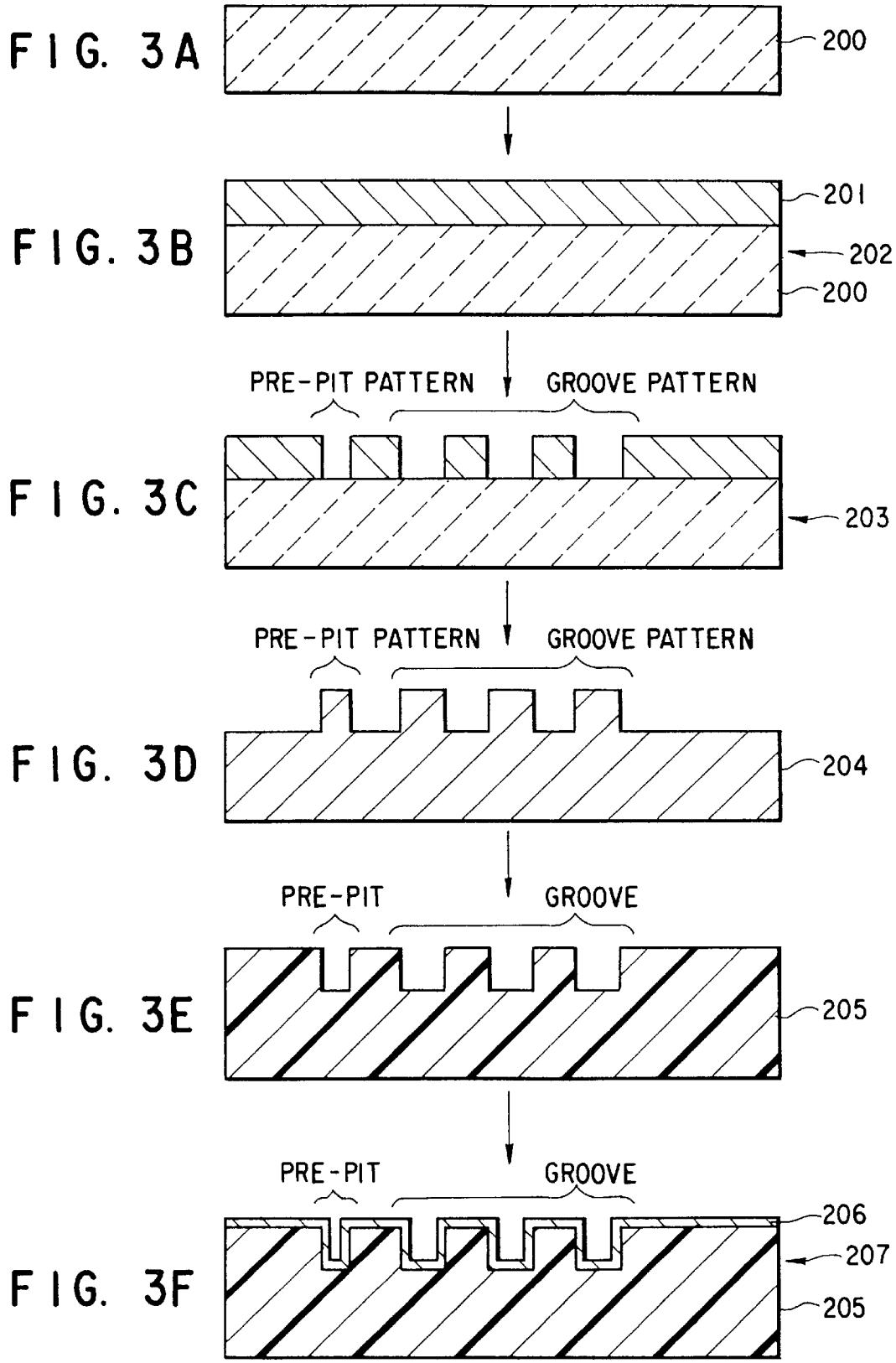
FIGS. 3A to 3F are diagrams showing the production method of a phase-change optical disk of the embodiment.

Hereinafter embodiments of the present invention will be explained with reference to the accompanied drawings.

FIG. 1 shows a schematic configuration of an embodiment of an optical disk of the present invention. As shown in FIG. 1, the optical disk 1 of this embodiment is a medium capable of recording and reproducing. As a typical example thereof, a magneto-optical disk or a phase-change disk can be presented. In the optical disk 1, a recording film is formed on a disk substrate comprising a transparent insulating substrate. In the case of a magneto-optical disk, a ferroelectric perpendicular magnetization film is used as the recording film. In the case of a phase-change disk, a recording film, which causes the phase transition between the crystalline and the amorphous by the heat generated by the light beam irradiation, is used.

The optical disk 1 of this embodiment has a spindle hole 2 for the fixation to an optical disk drive device later described. Control tracks 3, 4 are formed at least one of the innermost periphery and the outermost periphery at least on one side of the substrate of the optical disk 1. Grooves for tracking are formed in an information recording domain 5 between the control tracks 3, 4. Since only the grooves are formed on the substrate of the optical disk 1 in the information recording domain 5, ID information such as address information corresponding to the format needs to be recorded for recording information in the optical disk 1. This operation is called formatting. And a pre-pit is formed at least in one of the control tracks 3, 4 on the substrate of the optical disk 1 as the format condition information for conducting the treatment including determination of the starting point of the formatting. Information indicated by the pre-pit includes identifying information of the optical disk 1, information on the recording characteristics of the recording film on the optical disk 1, and information on the starting point and the finishing point of recording address information in the optical disk 1.

Identifying information of the optical disk 1, information on the recording characteristics of the recording film on the optical disk 1, and information on the starting point and the finishing point of recording address information in the optical disk 1, indicated by the pre-pit as the format condition information, will be specifically explained. That is, the identifying information of the optical disk 1 includes the kind of the optical disk 1, the version thereof, the disk diameter, the readout speed, the linear density, the track pitch, and the linear velocity. The information on the recording characteristics of the recording film include the recording power of each of the lands or the grooves, the erasing power, the reproducing power and the pulse width of each recording pulse. The information on the starting point and the finishing point of recording address information includes the address starting number and the address finishing number.

As shown in FIG. 2, plural of grooves and lands, which function as a track 9 to be used for the servo control (tracking control), are formed in the disk diameter direction of the information recording domain 5. A plurality of sectors 10 are defined in the disk circumferential direction of the information recording domain 5.

The formatting on the optical disk 1 will be explained with reference to FIG. 2. A plurality of tracks (grooves or lands) 9 are formed on the information recording domain 5. Each track 9 comprises a plurality of sectors 10. Each sector 10 comprises an address portion 11, a flag portion 12, a data portion 13 and a buffer portion 14.

The address portion 11, the flag portion 12, the data portion 13, and the buffer portion 14 have the below-mentioned configuration. The address portion 11 corresponds with header information (information on the position of recording information) of the data portion 13 later described. The header information includes the sector number for indicating the address number, the track number and the land/groove identifying information. The sector number indicates the physical address of the sector 10 on the optical disk 1. The track number indicates the physical track number on the optical disk 1. The track number not only indicates the physical track number on the optical disk 1 but sometimes indicates the logical track number counted according to the number of the sectors comprising one track. The land/groove identifying information shows whether the corresponding track 9 is a land track or a groove track. The flag portion 12 shows whether the corresponding sector 10 is recorded, defective, or erased. The data portion 13 is a domain where the user records information to be recorded. The buffer portion 14 is a domain provided for preventing overwrite of the top part of the address portion 11 of the next sector even with a rotation irregularity of the optical disk 1 in recording information in the data portion 13. In actual formatting, only the address portion 11 is recorded in the recording domain 5 with the optical disk drive device.

An example of a production method of an optical disk 1 of this embodiment will be explained with reference to FIGS. 3A to 3F. The point of the production method of the present invention is that not only grooves (or lands) but also pre-pits are formed on an original plate at the time of producing the original plate (recording an original plate). With the original plate, an optical disk is produced in the same manner as in the conventional technology.

A glass plate 200 is prepared as shown in FIG. 3A.

A pre-exposure original plate 202 is obtained by applying a photo resist 201 on the glass plate 200 as shown in FIG. 3B.

The photo resist 201 is exposed by irradiating a laser beam to the pre-exposure original plate 202 according to a recording signal from an exposing device (not illustrated) as shown in FIG. 3C. By developing the photo resist 201 after the pattern exposure, the exposed portion in the photo resist 201 is removed. Accordingly, an original plate 203 where a pre-pit pattern and a groove pattern are formed is produced.

A stamper 204 is produced by the original plate 203 as shown in FIG. 3D.

A disk substrate 205 is formed by the injection molding utilizing the stamper 204 as shown in FIG. 3E.

An optical disk 207 capable of recording and reproducing is produced by forming a recording film 206 on the surface of the disk substrate 205 where the groove and the pre-pit are formed, as shown in FIG. 3F.

The form of a pre-pit on the optical disk 1 will be explained with reference to FIGS. 4 to 8, which show various arrangement of a groove 21 and a pre-pit 22 on the optical disk 1.

Figure 4:
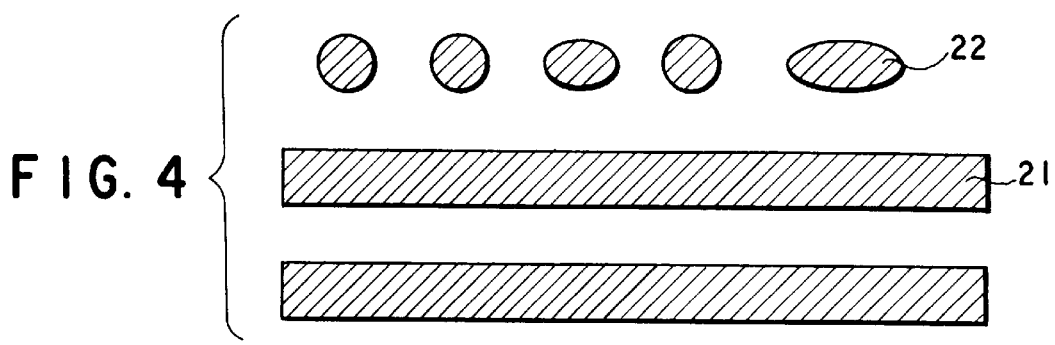
FIG. 4 is a diagram showing a first example of the arrangement of pre-pits and grooves recorded on the optical disk of the embodiment.
Figure 5:
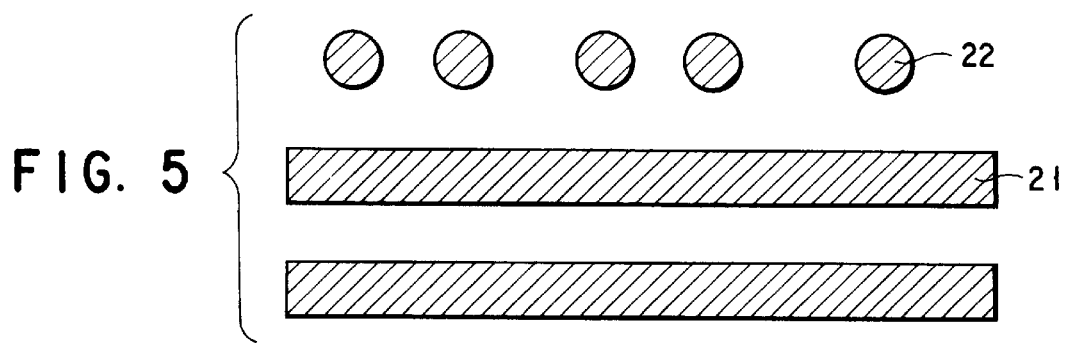
FIG. 5 is a diagram showing a second example of the arrangement of pre-pits and grooves recorded on the optical disk of the embodiment.

In FIG. 4, a pre-pit 22 having different lengths according to the PWM method is recorded adjacent to the groove 21 at a position corresponding to the position where the groove is formed. In FIG. 5, a pre-pit 22 having different intervals (length of between pre-pits) according to the PPM method is formed adjacent to the groove 21 at a position corresponding to the position where the groove is formed.

Figure 6:
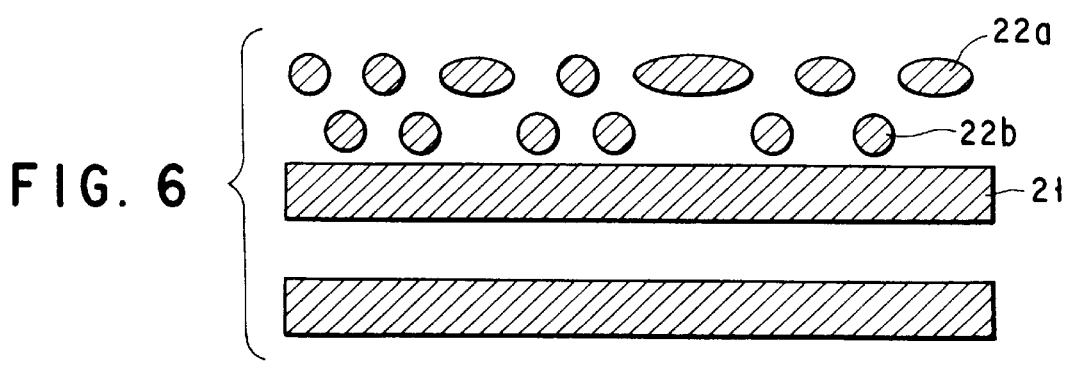
FIG. 6 is a diagram showing a third example of the arrangement of pre-pits and grooves recorded on the optical disk of the embodiment.
Figure 7:
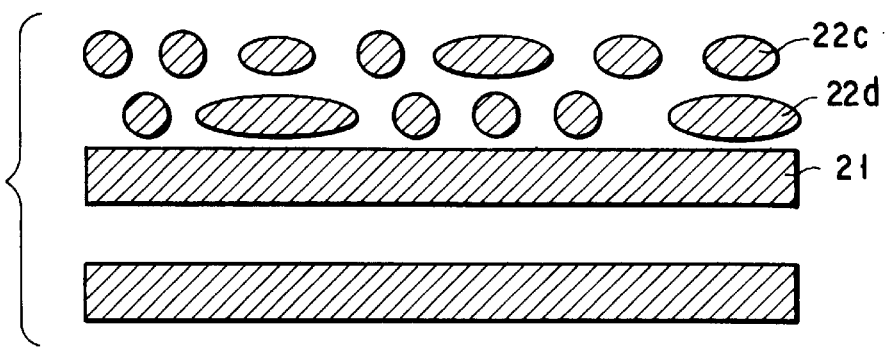
FIG. 7 is a diagram showing a fourth example of the arrangement of pre-pits and grooves recorded on the optical disk of the embodiment.
Figure 8:
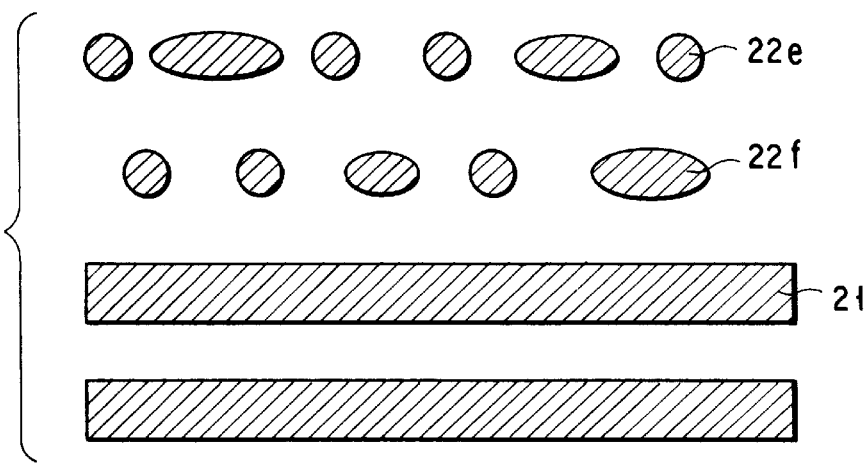
FIG. 8 is a diagram showing a fifth example of the arrangement of pre-pits and grooves recorded on the optical disk of the embodiment.

In FIGS. 6 to 8 show the disk substrate 205 formed pre-pits 22a, 22b, thereon, accordance with the different recording/reproducing method.

In FIG. 6, pre-pits 22a, 22b having different lengths according to the PWM method and having different intervals according to the PPM method are formed adjacent to the groove 21 at a position corresponding to the position where the groove is formed and at a position corresponding to the position where the land is formed. In FIG. 7, pre-pits 22c, 22d are formed adjacent to the groove 21 at a position corresponding to the position where the groove is formed and at a position corresponding to the position where the land is formed. Here the format condition information following the 8/16 modulation method is recorded by the pre-pit 22c in accordance with the PWM method, and the format condition information following the 1/7 modulation method is recorded by the pre-pit 22d in accordance with the PWM method. In FIG. 8, a pre-pit 22e is formed at a first groove position adjacent to the groove 21, and a pre-pit 22f is formed at a second groove position adjacent to the first groove. The format condition information following the 8/16 modulation method is recorded by the pre-pit 22e in accordance with the PWM method, and the format condition information following the 1/7 modulation method is recorded by the pre-pit 22f in accordance with the PWM method.

As heretofore explained, according to the present optical disk is formed by pre-pits corresponding to the different recording and modulating schemes, thereby the optical disk can be adapted to a plurality of the recording and modulating schemes.

The recording method of the pre-pit 22 will be explained with reference to FIGS. 9 and 10.

Figure 9:
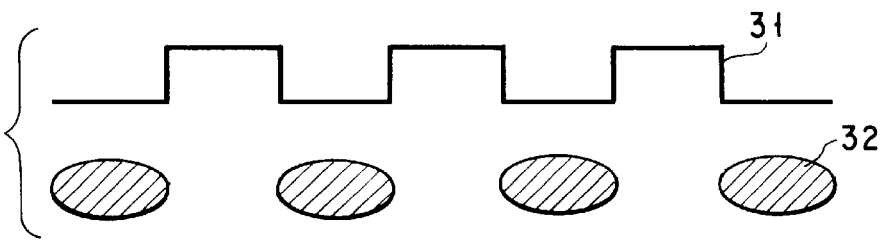
FIG. 9 is a diagram showing the relationship between the pits and the recording signal for describing an example of a recording method of pre-pits.
Figure 10:
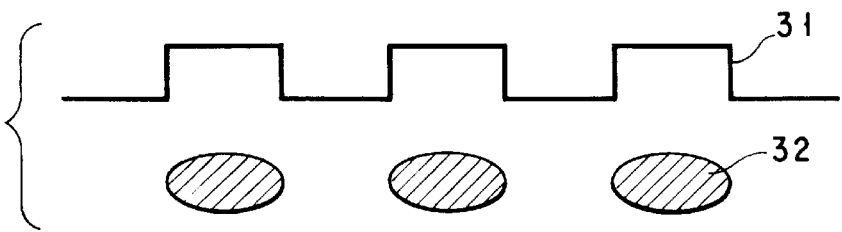
FIG. 10 is a diagram showing the relationship between the pits and the recording signal for describing another example of a recording method of pre-pits.

FIG. 9 shows a recording method where a pit 32 is formed by irradiating a laser beam onto an optical disk at an "L" (low level) portion of a recording signal 31. FIG. 10 shows a recording method where a pit 32 is formed by irradiating a laser beam onto an optical disk at an "H" (high level) portion of a recording signal 31.

The difference between the recording methods of FIGS. 9 and 10 will be explained. For example, with respect to the original information of "01000100100", the recording signal is converted as "LHLLLHLLHLL" (H: high level, L: low level). In the case the recording signal is recorded by the recording method of FIG. 10, the length of the land varies but the size of the pre-pit becomes the same. On the other hand, if the same recording signal is recorded by the recording method of FIG. 9, the length of the pre-pit varies but the size of the land becomes the same.

As heretofore explained, according to this embodiment, an optical disk capable of recording and reproducing comprises a substrate and a recording film formed on the substrate, with only groove information for tracking is recorded afterwards on the substrate but ID information is recorded onto the recording film for formatting. In the optical disk, a pre-pit is formed on the substrate as the format condition information for defining the starting point of formatting, and thus the starting point of formatting can be determined. As a result, a problem such as the irregularity of the radius position with respect to the address information or incomplete formatting due to misplacement of the formatting starting point toward the outer-diameter side caused by disturbance so that a predetermined domain of the disk cannot be formatted, can be prevented.

Further, by recording the identifying information of the optical disk, the information on the recording characteristics of the recording film, and the information on the starting point and the finishing point of the address information as a pre-pit for determining the formatting starting point, the information can be grasped at the time of reproducing the pre-pit. As a result, the information need not be inputted again at the time of using the optical disk, so that the burden on the user or the system can be alleviated as well as recording and reproducing can be conducted accurately in conditions proper to the optical disk to be used.

Further, by recording the pre-pit for determining the formatting starting point on a domain on the optical disk outside the information recording domain, the original information recording domain need not be cut for the pre-pit without sacrificing the memory capacity, and thus it is advantageous.

The operation of formatting the optical disk with an optical disk drive device will be explained.

Figure 11:
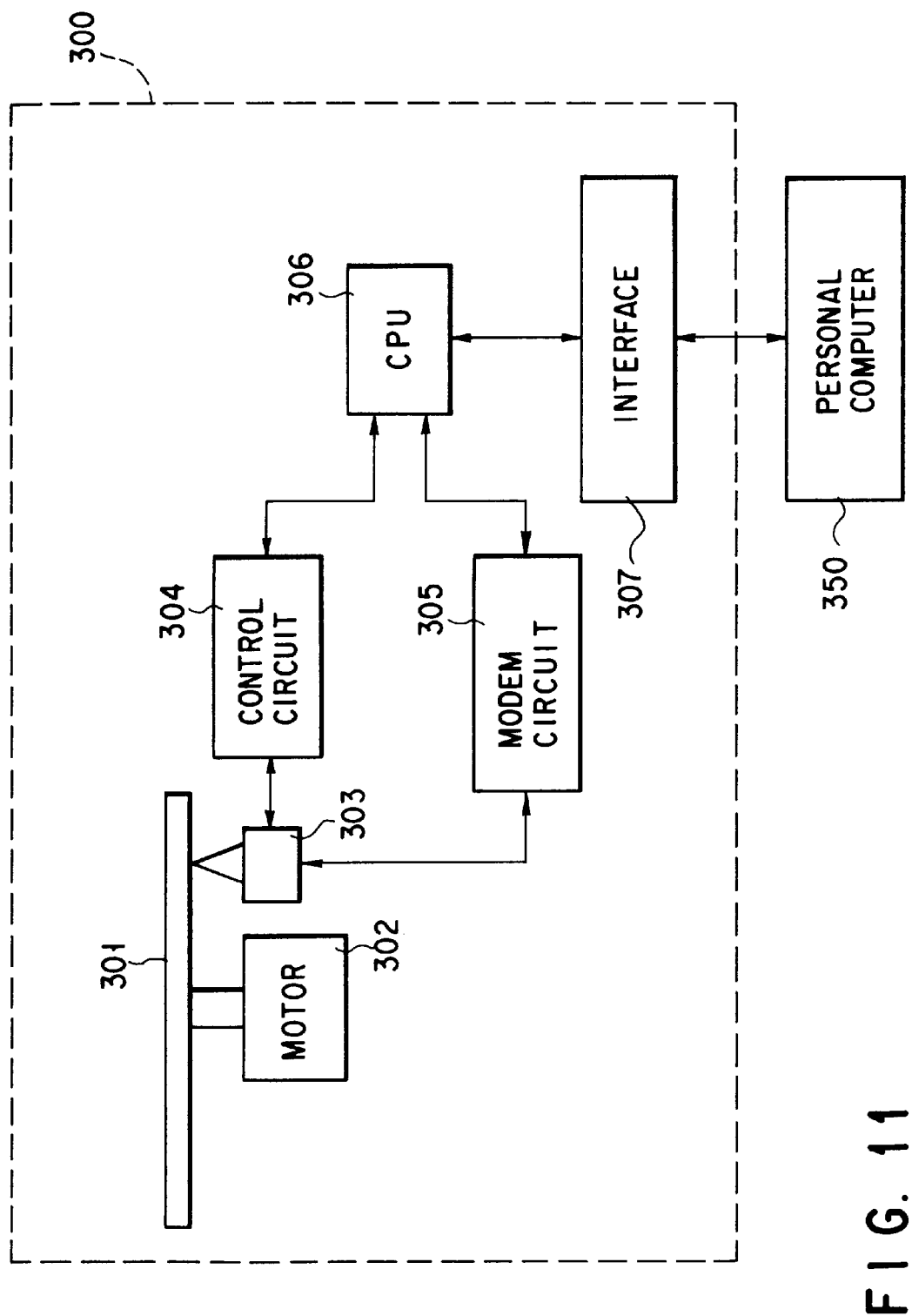
FIG. 11 is a block diagram showing the schematic configuration of an optical disk drive device connected to a personal computer.

FIG. 11 is a block diagram showing the schematic configuration of an optical disk drive device 300, connected with a personal computer 350. The optical disk drive device 300 comprises an optical disk 301, a motor 302 for driving the optical disk 301, an optical head 303, a control circuit 304, a modem circuit 305, a CPU 306 and an interface 307. The personal computer 350 is connected with the interface 307. The optical disk 301 is the same as the optical disk 1 shown in FIG. 1. The optical disk 301 forms the format condition information indicated by the pre-pit in the control track 3 at the inner-diameter side and the control track 4 at the outer-diameter side.

At the time of formatting, after setting the optical disk 301 in the optical disk drive device 300, a formatting command is dispatched from the personal computer to the optical disk drive device 300.

The formatting command is received at the CPU 306 via the interface 307 in the optical disk drive device 300. The control circuit 304 starts focusing control to the optical head 303 based on the command from the CPU 306 for focusing a light beam outputted from the optical head 303 on the recording surface of the optical disk 301.

Based on the command from the CPU 306, the control circuit 304 moves the optical head 303, for example, to the control track 3 at the inner-diameter side. When the optical head 303 reaches the position of the control track 3, the control circuit 304 stops the movement of the optical head 303 based on the command from the CPU 306 and conducts tracking control so that a light beam outputted from the optical head 303 follows the track.

A reflected light from the pre-pit on the optical disk 301 is detected by the optical head 303 so that the format treatment information indicated by the pre-pit, that is, the identifying information of the optical disk 301, the recording characteristics of the recording film, and the information on the starting point and the finishing point of recording the address information is reproduced via the modem circuit 305, and the content is confirmed by the CPU 306. After the confirmation, the optical head 303 moves to the portion of the end of the control track 3 and start recording on the address portion 11 based on the information preliminarily read. After finishing the process, a finishing command is dispatched to the personal computer 350. Since the format condition information indicated by the pre-pit is formed on the control tracks 3, 4 here, not only the inner-diameter side control track 3 but also the outer-diameter side control track 4 can be reproduced. The format condition information indicated by the pre-pit can be formed on either one of the control tracks 3, 4 of the inner-diameter side or the outer-diameter side.

As heretofore explained, according to the present invention, since the format condition information is provided in the substrate beforehand, formatting can be conducted accurately by reproducing the format condition information at the time of formatting.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

We claim:

1. An optical disk having an information recording domain comprising:
    a substrate provided with a servo information for a tracking control, and a format condition information for formatting said information recording domain; and
    a recording film formed on the surface of said substrate provided with said servo information and said format condition information, said recording film including said information recording domain,
    wherein said information recording domain is formatted in accordance with said format condition information.

2. An optical disk according to claim 1, wherein said servo information comprises a plenty of lands and/or grooves.

3. An optical disk according to claim 1, wherein said format condition information is provided in a domain outside said information recording domain on said substrate.

4. An optical disk according to claim 1, wherein said format condition information is provided to at least one selected from the group consisting of the outer-diameter side and the inner-diameter side of said information recording domain on said surface.

5. An critical disk according to claim 1, wherein said format condition information consists of a plurality of pits.

6. An optical disk according to claim 1, wherein said format condition information includes information on the starting point and the finishing point of recording address information.

7. An optical disk according to claim 6, wherein said format condition information further includes at least one of an identifying information of the optical disk and an information on the recording characteristics of the recording film.

8. An optical disk according to claim 1, wherein said format condition information includes the information in accordance with at least two different kinds of recording/reproducing method.

9. An optical disk according to claim 8, wherein said recording/reproducing method is a pulse position modulation method or pulse width modulation method.

10. An optical disk according to claim 8, wherein said recording/reproducing method is a modulating method.

11. A optical disk according to claim 10, wherein said modulating method is a 8/16 modulation and 1/7 modulation.

12. An optical disk drive comprising:
    an optical disk comprising a substrate provided with a servo information for a tracking control and a format condition information for formatting an information recording domain, and a recording film which includes said information recording domain and is formed on the surface of said substrate,
    a motor configured to rotate said optical disk;
    an optical head configured to receive said format condition information from said optical disk and to format said information recording domain,
    a modem circuit configured to reproduce said format condition information from said optical head;
    a CPU configured to receive a reproduced format condition information from said modem circuit and to receive a formatting information;
    control circuit configured to control focusing and tracking of said optical head in accordance with said formatting information received from said CPU during a formatting operation of said optical head.

13. An optical disk drive according to claim 12, wherein said servo information comprises a plurality of at least one of lands and grooves.

14. An optical disk drive according to claim 12, wherein said format condition information is provided in a domain outside said information recording domain on said substrate.

15. An optical disk drive according to claim 12, wherein said format condition information is provided to at least one selected location from the group consisting of the outer-diameter side and the inner-diameter side of said information recording domain on said surface.

16. An optical disk drive according to claim 12, wherein said format condition information consists of a plurality of pits.

17. An optical disk drive according to claim 12, wherein said format condition information includes information on the starting point and the finishing point of recording address information.

18. An optical disk drive according to claim 17, wherein said format condition information further includes at least one of an identifying information of the optical disk and an information on the recording characteristics of the recording film.

19. An optical disk drive according to claim 12, wherein said format condition information includes information in accordance with at least two different recording/reproducing methods.

20. An optical disk drive according to claim 19, wherein said recording/reproducing methods include at least one of a pulse position modulation method and a pulse width modulation method.

21. An optical disk drive according to claim 19, wherein said recording/reproducing methods comprise a modulating method.

22. A optical disk drive according to claim 21, wherein said modulating methods comprise an 8/16 modulation method and a 1/7 modulation method.

* * * * *